(12) United States Patent
Cheng et al.

(10) Patent No.: US 9,274,809 B2
(45) Date of Patent: Mar. 1, 2016

(54) ELECTRONIC APPARATUS HIBERNATION RECOVERY SETTING METHOD AND ELECTRONIC APPARATUS HAVING HIBERNATION STATE AND HIBERNATION RECOVERY MECHANISM

(71) Applicant: MStar Semiconductor, Inc., Hsinchu Hsien (TW)

(72) Inventors: Sheng-Wei Cheng, Hsinchu county (TW); Sheng-Yen Hong, Hsinchu county (TW); Che-Wei Chang, Hsinchu county (TW); Yuan-Hao Chang, Hsinchu county (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 183 days.

(21) Appl. No.: 14/140,648

(22) Filed: Dec. 26, 2013

(65) Prior Publication Data

US 2014/0189334 A1    Jul. 3, 2014

(30) Foreign Application Priority Data

Dec. 28, 2012  (TW) .............................. 101151017 A

(51) Int. Cl.
G06F 15/177    (2006.01)
G06F 9/44    (2006.01)

(52) U.S. Cl.
CPC ................................. *G06F 9/4418* (2013.01)

(58) Field of Classification Search
CPC ....................................................... G06F 9/4418
See application file for complete search history.

(56) References Cited

U.S. PATENT DOCUMENTS

| 2011/0016417 | A1* | 1/2011 | Shiplacoff | G06F 1/3228 715/768 |
| 2013/0055000 | A1* | 2/2013 | Lee | G06F 1/3215 713/323 |
| 2013/0166932 | A1* | 6/2013 | Iarovici | G06F 1/3206 713/323 |

FOREIGN PATENT DOCUMENTS

TW    201011525 A    7/2009

* cited by examiner

*Primary Examiner* — Kim Huynh
*Assistant Examiner* — Eric Chang
(74) *Attorney, Agent, or Firm* — WPAT, PC; Justin King

(57) ABSTRACT

An electronic apparatus hibernation recovery setting method for an electronic apparatus is provided. The method includes: assigning different priorities to multiple tasks in process before the electronic apparatus enters a hibernation state; storing multiple image files of the tasks; and first reading and loading the image file for the task having a highest priority when the electronic apparatus recovers from the hibernation state.

16 Claims, 4 Drawing Sheets

ELECTRONIC APPARATUS HIBERNATION RECOVERY SETTING METHOD AND ELECTRONIC APPARATUS HAVING HIBERNATION STATE AND HIBERNATION RECOVERY MECHANISM

This application claims the benefit of Taiwan application Serial No. 101151017, filed Dec. 28, 2012, the subject matter of which is incorporated herein by reference.

BACKGROUND OF THE INVENTION

1. Field of the Invention

The invention relates in general to an electronic apparatus hibernation recovery setting method and an electronic apparatus having a hibernation state and a hibernation recovery mechanism, and more particularly, to an electronic apparatus hibernation recovery setting method and an electronic apparatus having a hibernation state and a hibernation recovery mechanism that assign different priorities for different tasks and read image files according to the priorities.

2. Description of the Related Art

In addition to a normal power-on/off procedure, an electronic apparatus is generally provided with a hibernation mechanism for prompting the electronic apparatus to enter a suspend-to-disk state, also commonly referred to as a hibernation state. Under the hibernation state, a hibernation image file recording all tasks in process on the electronic apparatus is generated and stored for all components of the electronic apparatus before entering the hibernation state. When recovering from the hibernation state, the hibernation image file is read and loaded, and the electronic apparatus is restored to a state prior to entering the hibernation state according to the hibernation image file.

The storable hibernation image file is limited to a certain size. In some prior art, a part of memory pages in the hibernation image file is relocated to swap space in a hard drive through a predetermined algorithm and stored therein. After completing the recovery from the hibernation state, the relocated memory pages are loaded by a habitual page fault process of a virtual memory to solve the issue of insufficient memory. Although the above conventional solution effectively overcomes the issue of insufficient memory, inevitable lag occurring in a normal operation period is resulted from the page default process for loading the memory pages in the hard drive. In designs of certain hibernation mechanisms, data of a colossal amount of memory pages need to be placed into swap space, which further leads to a greater lag. For example, in a Software Suspend algorithm of a conventional hibernation technique, a total number of at least one-half of the memory pages need to be placed into swap space.

In another conventional hibernation technique, e.g., TuxOnIce, the number of memory pages placed into swap space is reduced to below one-half. However, an electronic apparatus exits a hibernation state and starts executing all tasks only when a hibernation image file corresponding to all the tasks is altogether read and completely loaded, such that a time required for recovering from the hibernation state may be extended. Such occurrence is aggravated as the number of tasks in process becomes larger. Consequently, as all tasks have different priorities and tasks with higher priorities can only be operated after recovering and executing all the tasks, the hibernation recovery of an electronic apparatus utilizing the above hibernation mechanism is quite inefficient.

SUMMARY OF THE INVENTION

The invention is directed to an efficient electronic apparatus hibernation recovery setting method, and an electronic apparatus that can be efficiently recovered from a hibernation state.

According to an embodiment of the present invention, an electronic apparatus hibernation recovery setting method for an electronic apparatus is provided. The method comprises: assigning different priorities to a plurality of tasks in process before the electronic apparatus enters a hibernation state; storing a plurality of image files of the tasks; and first reading and loading the image file for the task having a highest priority when the electronic apparatus recovers from the hibernation state.

According another embodiment of the present invention, an electronic having a hibernation state and a hibernation recovery mechanism is provided. The electronic apparatus comprises a storage device and a control unit. Upon receiving a hibernation instruction, the control unit prompts the electronic apparatus to enter a hibernation state. Before the electronic apparatus enters the hibernation state, the control unit assigns different priorities to a plurality of tasks in process on the electronic apparatus, and stores a plurality of image files of the tasks to the storage device. Further, the control unit first reads and loads the image file having the highest priority when the electronic device recovers from the hibernation state.

With the above embodiments, in the electronic apparatus hibernation recovery setting method disclosed by the present invention, the image files of the tasks are divided into different priorities, and the image file with the highest priority is first read and loaded when the electronic apparatus is recovered from the hibernation state. Without having to wait for other tasks with lower priorities, the hibernation recovery time for the task with the highest priority can be reduced, especially when there are a large number of tasks in the hibernation state.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
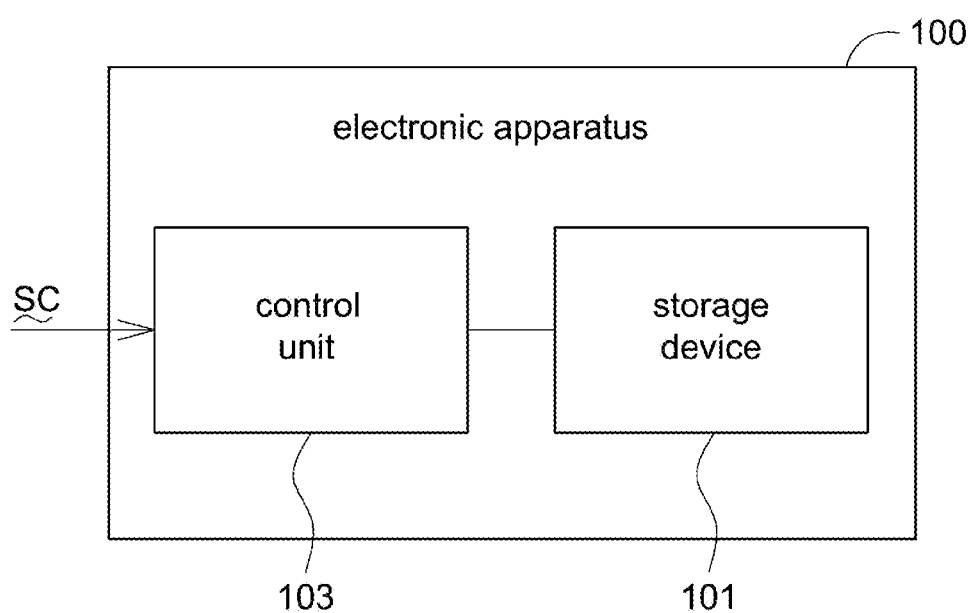
FIG. 1 is a block diagram of an electronic apparatus according to an embodiment of the present invention.

Details of embodiments of the present invention are to be described below. In the following embodiments, the conventional hibernation technique TuxOnIce is taken as an example of a conventional hibernation technique of the prior art. FIG. 1 is a block diagram of an electronic apparatus 100 according to an embodiment of the present invention. For example, the electronic apparatus 100 is a computer device, or an electronic apparatus capable of performing a specific function such as a television data processing apparatus or an audio/video playback apparatus. For example, the television data processing apparatus is a set-up-box, which receives and processes television data, and allows a display device to play channel data and to display a television program guide on the display device. For example, the audio/video playback apparatus is DVD player or a music player for playing various audio/video files. As shown in FIG. 1, the electronic apparatus 100 comprises a storage device 101 and a control unit 103. Upon receiving a hibernation instruction SC, the control unit 103 prompts the electronic device 100 to enter a hibernation state. In an embodiment, for example, the hibernation instruction is entered through a user interface (e.g., a keyboard or a mouse). The control unit 103 may also prompt the electronic apparatus 100 to enter the hibernation state without receiving the hibernation instruction, e.g., when the electronic apparatus 100 has idled for a predetermined period. Before the electronic apparatus 100 enters the hibernation state, the control unit 103 stores a hibernation image file of tasks in process on the electronic apparatus 100 to the storage device 101. The control unit 103 further defines priorities to accordingly categorize the tasks, and divides a region storing the hibernation image file into a plurality of image file regions, with different image file regions storing the tasks corresponding to different priorities. When recovering the electronic apparatus 100 from the hibernation state, the image file region corresponding to the highest priority is prior read and loaded. Through such categorization procedure, the recovery time of a task with the highest priority can be shortened. In an embodiment, the control unit 103 further supports a prefetch function in addition to the categorization procedure. With the prefetch function, the control unit 103 allows the electronic apparatus 100 to prefetch the task with a lower priority at the same time when the electronic apparatus completes loading and starts executing the task with the highest priority, so as to meet the time requirement for recovery while reducing the recovery time for the task with the highest priority. In an alternative embodiment, through fully utilizing an input/output (I/O) bandwidth of the recovery period, the control unit 103 prefetches memory pages stored in swap space of a hard drive, so that no additional lag during a normal operation period is resulted while reducing the hibernation image file.

Figure 2:
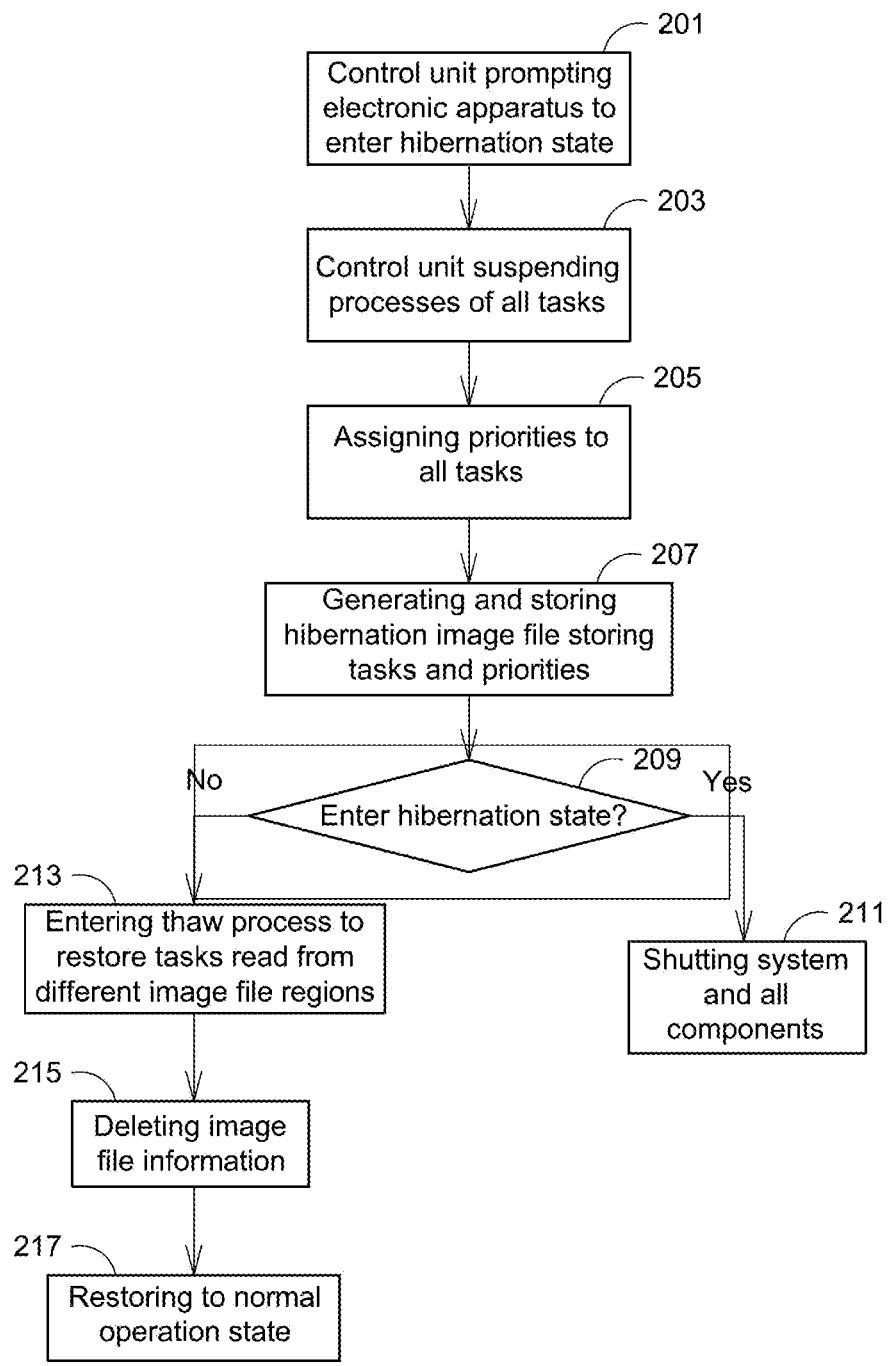
FIG. 2 is a flowchart of a process of the electronic apparatus in FIG. 1.

FIG. 2 shows a flowchart of a process of the electronic device in FIG. 1. In an embodiment, the process in FIG. 2 comprises the following steps.

In step 201, the control unit 103 prompts the electronic apparatus 100 to enter a hibernation state.

In step 203, the control unit 103 suspends processes of all tasks in process.

In step 205, the control unit 103 assigns priorities to all the tasks. It should be noted that one priority may correspond to more than one task. In an embodiment, for example, the tasks are categorized into high, medium and low priorities.

The task priorities may be determined by various approaches. In an embodiment, the priorities are determined according to recently used information. That is to say, as a processed time point of a task is closer to a time point at which the control unit 103 receives the hibernation instruction or the electronic apparatus 100 is to enter the hibernation state, the priority assigned to the task by the control unit 103 gets higher.

In an embodiment, as a correlation of a task with a predetermined function gets higher, the priority assigned to the task by the control unit 103 also gets higher. For example, assuming that the electronic apparatus 100 is the abovementioned television data processing apparatus, a task having a higher correlation with a television guide function is assigned with the highest priority. Alternatively, assuming that the electronic apparatus 100 is the abovementioned audio/video playback apparatus, a task having a higher correlation with an audio/video playback function is assigned with the highest priority.

In step S207, an image file recording the tasks and the corresponding priorities is generated and stored. As previously described, in an embodiment, the tasks may be categorized into high, medium and low priorities, and so the tasks are also divided into three categories respectively corresponding to three storage page sets. From perspectives of memory storage, a region storing the image file is divided into a plurality of image file regions, with different image file regions storing the tasks corresponding to different priorities. The storage page sets are information of corresponding memory pages included in different image file regions. That is to say, the hibernation image file comprises the tasks and the respective corresponding storage page sets, and the tasks are respectively stored in the corresponding image regions in the categorized storage page set. In an embodiment, in step 207, a part of the memory pages are written into swap space of a hard drive to compress the hibernation image file.

In step 209, it is determined whether to enter the hibernation state. Step 211 is performed of affirmative, or else step 213 is performed if negative.

In step 211, the system is shut down and all components are shut down to enter the hibernation state. It should be noted that, instead of the hibernation method with all components being shut down, a hibernation method with at least one component still activated may also be designed in an alternative embodiment.

As previously described, in an embodiment, when the electronic apparatus in the hibernation state is to be recovered from the hibernation state, the control unit first reads the image file region of the task with the highest priority, and at the same time reads the image file region of the task with the second high priority at the same time when completely reading and loading the image file region (i.e., to allow the corresponding task to restore to an original function in step 213 below). Taking the foregoing example for instance, when completely loading the image file region with the high priority, the image file region with the medium priority is read to complete the prefetch of the image file region in a recovery period.

In step 231, a thaw process is entered to restore the tasks read from different image file regions.

In step 215, the image file information is deleted.

In step 217, a normal operation state is restored.

Figure 3:
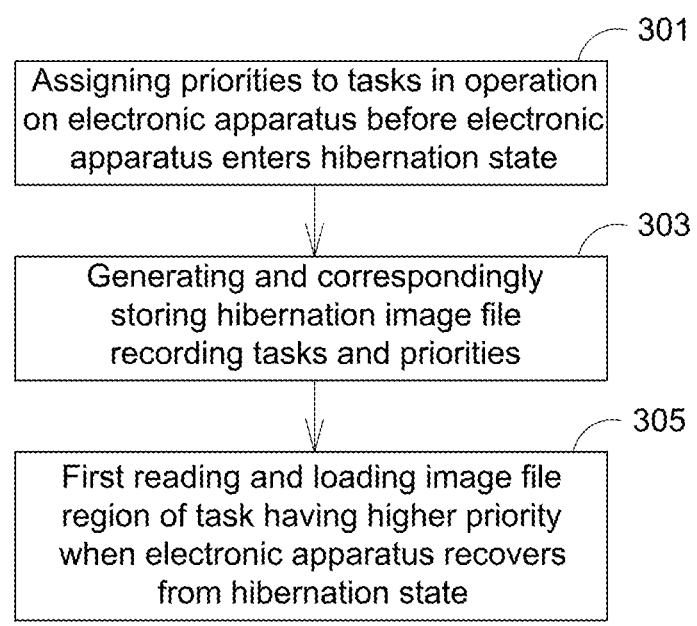
FIG. 3 is a flowchart of an electronic apparatus hibernation recovery setting method according to an embodiment of the present invention.

According to the foregoing embodiment, a hibernation recovery setting method may be implemented, as shown by a flowchart in FIG. 3.

In step 301, before the electronic apparatus enters a hibernation state, priorities of tasks in process on the electronic apparatus are defined (steps 203 and 205).

In step 303, a hibernation image file recording the tasks and the corresponding priorities is generated and stored (step 208).

In step 305, when the electronic apparatus is recovered from the hibernation state, an image file region of the task with the highest priority is first read and loaded.

Other details of the steps may be inferred from the foregoing embodiment and shall be omitted herein.

Figure 4:
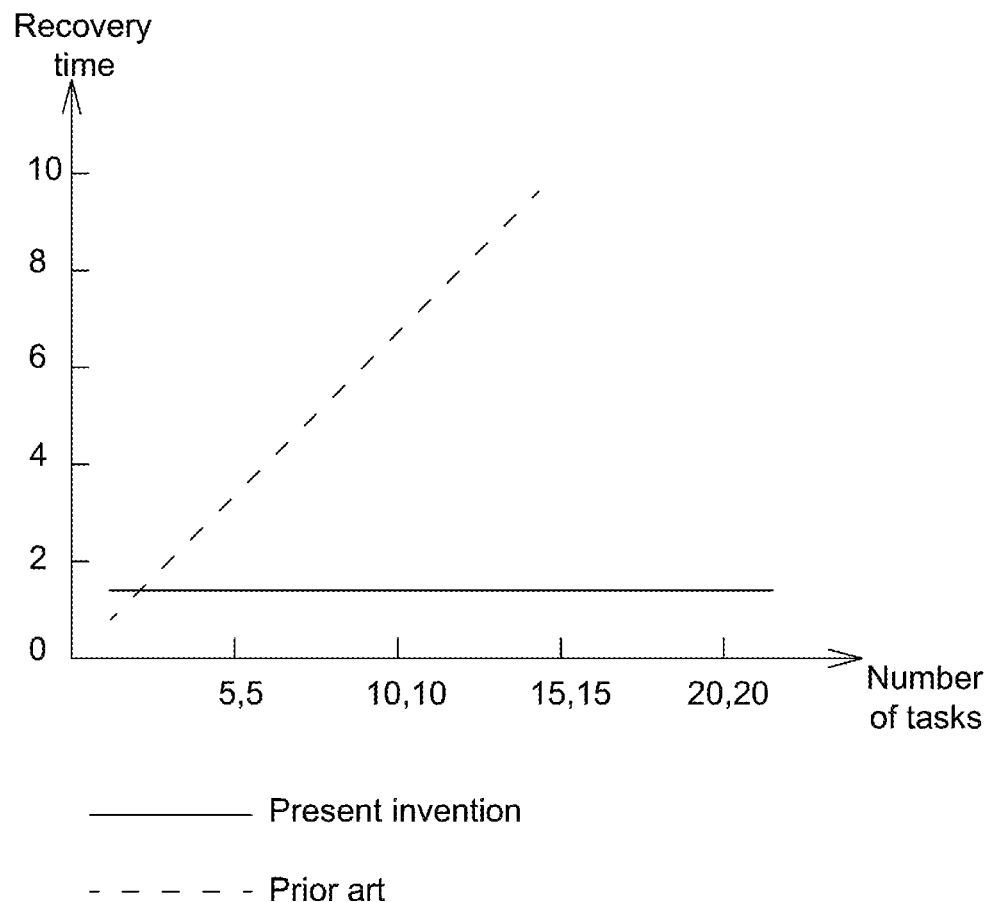
FIG. 4 is a schematic diagram of performance of an electronic apparatus hibernation recovery setting method according to an embodiment of the present invention and performance of an electronic apparatus hibernation recovery setting method of the prior art.

FIG. 4 shows a schematic diagram of hibernation recovery time of a high-priority task in a hibernation recovery setting method of the present invention and a hibernation recovery setting method of the prior art. In FIG. 4, the horizontal axis represents the number of tasks in process having entered the hibernation state, and the vertical axis represents the hibernation recovery time of a task with the highest priority. As shown in FIG. 4, in the prior art, the hibernation recovery time of a task with the highest priority remarkably increases as the number of tasks in process having entered the hibernation state gets larger. In contrast, with the hibernation method of the present invention, as a task with the highest priority is first read and recovered from the hibernation state, the hibernation recovery time of a highest-priority task can be maintained at a stable value rather than being increased as the number of tasks having entered the hibernation state increases.

With the foregoing embodiments, the electronic apparatus hibernation recovery setting method provided by the present invention is capable of reducing the hibernation recovery time for a high-priority task, and the advantage is even more outstanding when the number of tasks having entered the hibernation state is large.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic apparatus hibernation recovery method, comprising:
   assigning a plurality of priorities to a plurality of tasks in process on an electronic apparatus before the electronic apparatus enters a hibernation state;
   generating and storing a hibernation image file comprising the tasks and the priorities to a hard drive, wherein the tasks with a same priority are stored in a same region of the hard drive; and
   loading and restoring a part of the hibernation image file associated with the highest priority of the priorities when the electronic apparatus recovers from the hibernation state.

2. The electronic apparatus hibernation recovery method according to claim 1, further comprising:
   simultaneously loading a part of the hibernation image file corresponding to one of the tasks corresponding to the second highest priority of the priorities when restoring the part of the hibernation image file.

3. The electronic apparatus hibernation recovery method according to claim 1, further comprising:
   detecting a plurality of processing time points of the tasks before the tasks enter the hibernation state; and
   assigning the priorities to the tasks according to the time points.

4. The electronic apparatus hibernation recovery method according to claim 3, further comprising:
   assigning higher priorities to the tasks as the processing time point of one of the tasks gets closer to a time point at which the electronic apparatus enters the hibernation state.

5. The electronic apparatus hibernation recovery method according to claim 1, wherein the priorities of the tasks are assigned to be higher as a correlation of a function of one of the tasks with a predetermined function gets higher.

6. The electronic apparatus hibernation recovery method according to claim 1, wherein the electronic apparatus is a television data processing apparatus, and the priorities of the tasks are assigned to be higher as a correlation of the tasks with a television guide function gets higher.

7. The electronic apparatus hibernation recovery method according to claim 1, wherein the electronic apparatus is an audio/video playback apparatus, and the priorities of the tasks are assigned to be higher as a correlation of the tasks with a playback function for an audio/video data gets higher.

8. The electronic apparatus hibernation recovery method according to claim 1, wherein the tasks are prefetched to a plurality of memory pages in swap space of a hard drive before being restored when the electronic apparatus recovers from the hibernation state.

9. An electronic apparatus having a hibernation state and a hibernation recovery mechanism, comprising:
   a storage device; and
   a control unit;
   wherein, the control unit assigns a plurality of priorities to a plurality of tasks in process on the electronic apparatus before the electronic apparatus enters the hibernation state, and generates and stores a hibernation image file comprising the tasks and the priorities to a hard drive, wherein the tasks with a same priority are stored in a same region of the hard drive; the control unit further first loads and restores a part of the hibernation image file associated with the highest priority of the priorities when the electronic device recovers from the hibernation state.

10. The electronic apparatus according to claim 9, wherein the control unit loads a part of the hibernation image file corresponding to one of the tasks corresponding to the second highest priority of the priorities when restoring the part of the hibernation image file.

11. The electronic apparatus according to claim 9, wherein the control unit detects a plurality of processing time points of the tasks before the tasks enter the hibernation state, and assigns the priorities according to the processing time points.

12. The electronic apparatus according to claim 11, wherein the control unit assigns higher priorities to the tasks as the processing time point of one of the tasks gets closer to a time point at which the electronic apparatus enters the hibernation state.

13. The electronic apparatus according to claim 9, wherein the control unit assigns higher priorities to the tasks as a correlation of a function of one of the tasks with a predetermined function gets higher.

14. The electronic apparatus according to claim 9, wherein the electronic apparatus is a television data processing apparatus, and the control unit assigns higher priorities to the tasks as a correlation of the tasks with a television guide function gets higher.

15. The electronic apparatus according to claim 9, wherein the electronic apparatus is an audio/video playback apparatus, and the control unit assigns higher priorities to the tasks as a correlation of the tasks with a playback function for an audio/video data gets higher.

16. The electronic apparatus according to claim 9, wherein the control unit prefetches the tasks to a plurality of memory pages in swap space of a hard drive before the tasks are restored when the electronic apparatus recovers from the hibernation state.

* * * * *